US011451603B2

(12) United States Patent
Grubb et al.

(10) Patent No.: US 11,451,603 B2
(45) Date of Patent: Sep. 20, 2022

(54) SELECTIVE PRE-CACHING OF MEDIA STREAMS

(71) Applicant: DISNEY ENTERPRISES, INC., Burbank, CA (US)

(72) Inventors: Jeffrey Grubb, South Amboy, NJ (US); Eric Ross Klein, Astoria, NY (US); Christopher J. Zucker, Brooklyn, NY (US); William B. May, Jr., Sunnyvale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/800,617

(22) Filed: Feb. 25, 2020

(65) Prior Publication Data
US 2021/0266353 A1  Aug. 26, 2021

(51) Int. Cl.
*H04L 67/5681* (2022.01)
*H04L 65/612* (2022.01)

(52) U.S. Cl.
CPC ........ *H04L 65/612* (2022.05); *H04L 67/5681* (2022.05)

(58) Field of Classification Search
None
See application file for complete search history.

(56) References Cited

U.S. PATENT DOCUMENTS

| 8,745,262 | B2 * | 6/2014 | Kohli | H04N 21/2407 370/352 |
| 10,277,669 | B1 | 4/2019 | Joliveau et al. | |
| 2011/0264731 | A1 * | 10/2011 | Knowles | H04L 67/2852 709/203 |
| 2013/0041970 | A1 * | 2/2013 | Pinto | G06F 16/9574 709/213 |
| 2014/0045475 | A1 * | 2/2014 | Anthony, Jr. | H04L 67/2842 455/418 |
| 2014/0045476 | A1 * | 2/2014 | Anthony, Jr. | H04L 67/2842 455/418 |
| 2014/0161050 | A1 * | 6/2014 | Grinshpun | H04N 21/2393 370/329 |
| 2014/0207912 | A1 * | 7/2014 | Thibeault | H04L 65/4084 709/219 |

(Continued)

OTHER PUBLICATIONS

Extended European Search Report for Application No. 21159059.1 dated Aug. 3, 2021.

(Continued)

*Primary Examiner* — Joshua Joo
(74) *Attorney, Agent, or Firm* — Artegis Law Group, LLP

(57) ABSTRACT

Various embodiments set forth a computer-implemented method for selectively caching digital content for streaming, comprising analyzing a set of traffic data associated with streaming of a plurality of media items in a first time period, selecting, based on the set of traffic data, a first media item for storage in a cache during a second time period, and storing in the cache, prior to receiving a request for the first media item in the second time period, at least a portion of a first media stream of a plurality of media streams associated with the first media item, and at least a portion of a second media stream of the plurality of media streams, wherein each media stream in the plurality of media streams is encoded with different characteristics.

19 Claims, 6 Drawing Sheets

(56) References Cited

U.S. PATENT DOCUMENTS

| | | | | |
|---|---|---|---|---|
| 2014/0281006 A1* | 9/2014 | Major | | H04L 65/4084 |
| | | | | 709/231 |
| 2014/0379840 A1* | 12/2014 | Dao | | H04L 67/2847 |
| | | | | 709/219 |
| 2015/0180924 A1* | 6/2015 | O'Callaghan | | H04L 43/0829 |
| | | | | 709/219 |
| 2016/0173639 A1* | 6/2016 | Tuliani | | H04L 67/2842 |
| | | | | 709/213 |
| 2017/0054800 A1 | 2/2017 | DiVincenzo et al. | | |
| 2017/0134276 A1* | 5/2017 | White | | H04L 45/7457 |
| 2017/0280434 A1* | 9/2017 | Begeja | | H04L 67/32 |
| 2018/0035147 A1* | 2/2018 | DeVreese | | H04N 21/2662 |
| 2018/0324278 A1* | 11/2018 | Fliam | | H04L 67/02 |
| 2019/0199765 A9* | 6/2019 | Ma | | H04L 65/103 |
| 2020/0177939 A1* | 6/2020 | Swaminathan | | H04L 47/805 |
| 2020/0401522 A1* | 12/2020 | Xu | | G06F 16/9574 |
| 2021/0021905 A1* | 1/2021 | Li | | H04N 21/8456 |
| 2021/0105312 A1* | 4/2021 | Yang | | H04L 65/1033 |
| 2022/0006877 A1* | 1/2022 | Gilson | | H04L 67/2842 |
| 2022/0121438 A1* | 4/2022 | Ranjan | | G06F 9/451 |

OTHER PUBLICATIONS

Gao et al., "Cost-efficient and QoS-aware Content Management in Media Cloud: Implementation and Evaluation", 2015 IEEE International Conference on Communications (ICC), DOI: 10.1109/ICC.2015.7249422, Jun. 8, 2015, pp. 6880-6886.

Li et al., "StreamCache: Popularity-based Caching for Adaptive Streaming over Information-Centric Networks", 2016 IEEE International Conference on Communications (ICC), DOI: 10.1109/ICC.2016.7511583, May 22, 2016, 6 pages.

* cited by examiner

SELECTIVE PRE-CACHING OF MEDIA STREAMS

BACKGROUND

Field of the Various Embodiments

Embodiments of the present disclosure relate generally to digital media and, more specifically, to selective pre-caching of media streams.

Description of the Related Art

Content streaming services offer clients access to a library of digital media, such as text, audio, audiovisual programs, and so forth. A video streaming service, for example, can provide a client access to a library of media items (e.g., movies, television episodes, songs, etc.). The client can use a playback application running on a client streaming device to view, or otherwise consume, the media items. In various content distribution infrastructures, clients attempting to access the media library connect to the video streaming service using different playback devices and under different operating conditions. Content servers within a content distribution network can deliver digital content to the client device via real-time streaming, enabling the client to initiate playback before the client has downloaded the complete media item.

Conventional content streaming services enhance streaming performance by storing digital content related to media items at edge servers distributed throughout a network. In such a manner, client devices may be served by edge servers that are closer to the client devices and therefore are more able to efficiently serve content to the client devices than other servers in the network. Storing the digital content at edge servers enables client devices to quickly receive the content from the closest (or otherwise most-efficient) edge servers for the given device in a given situation. This reduces the time between a client device requesting a media item and the client device receiving the content necessary to play the requested media item. Further, conventional content streaming services improve buffering and playback performance by storing digital content related to media items in the cache of an edge server before a client requests the particular media item (referred to herein as "pre-caching"). In such instances, the content distribution network delivers the content related to the media item from the higher-speed (but limited-capacity) cache of the edge server instead of the lower-speed (but larger) data store, thus further reducing the time required to receive the content necessary to play the requested media item.

Edge server cache storage capacity is limited, so pre-caching digital content related to one media item at an edge server may fill the edge server with rarely-accessed files, consuming space that could be occupied by more commonly-accessed files. For example, when a video streaming service provides a media item via adaptive streaming, the video streaming service maintains multiple versions (e.g., 30 distinct versions encoded at different bitrates or for different types of client devices) of digital content related to the same media item. As a result, the content distribution network stores separate files for each distinct version of the digital content. Consequently, when pre-caching a single media item for adaptive streaming, the media streaming service stores each version in the cache, including versions that are not regularly accessed by clients. As the cache has limited storage capacity, filling the cache with rarely-accessed versions wastes memory resources and cache storage resources without improving the streaming performance experienced by the majority of clients.

As the foregoing illustrates, more effective techniques for pre-caching audiovisual programs are needed in the art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
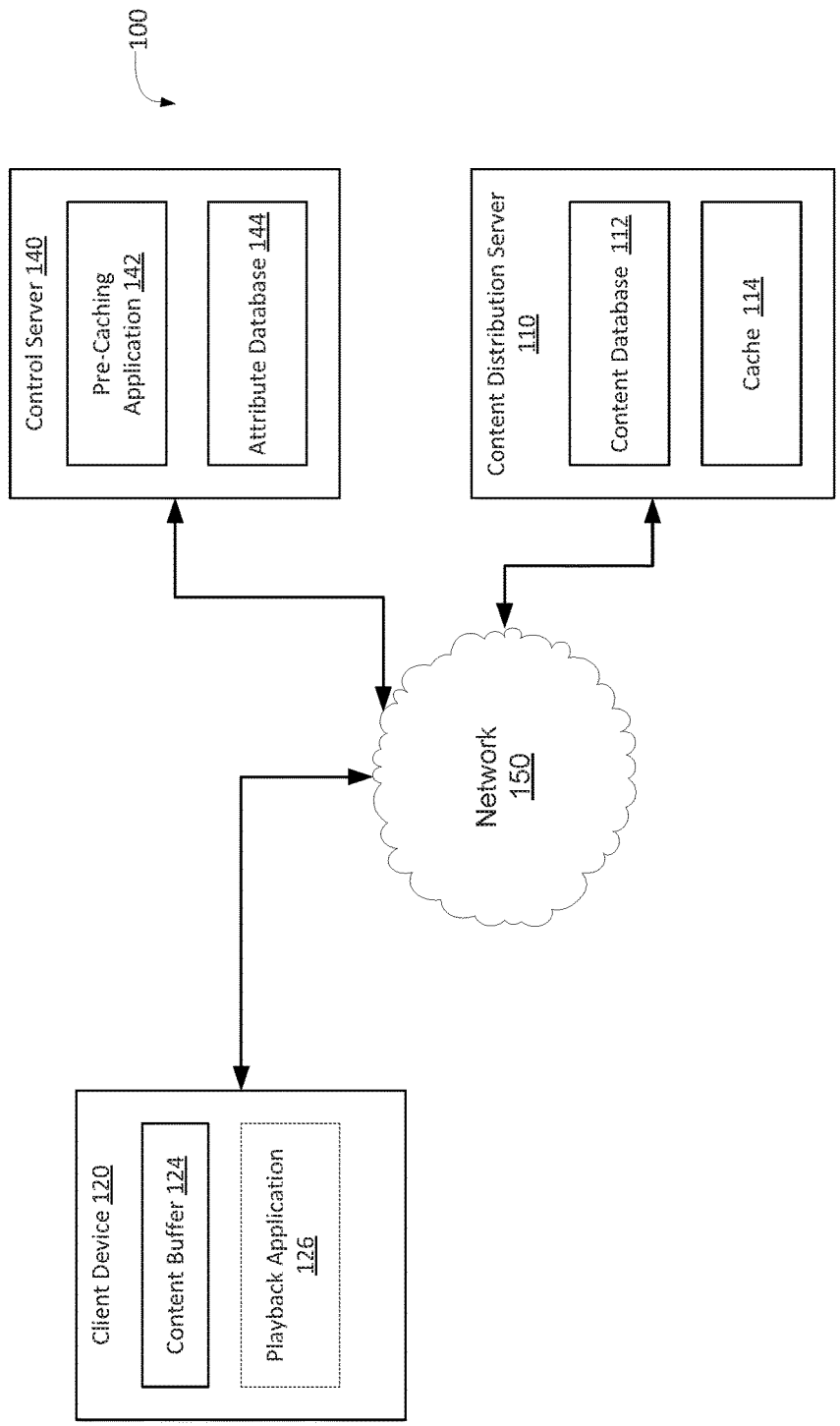
FIG. 1 illustrates a content distribution system configured to implement one or more aspects of various embodiments.

In the following description, numerous specific details are set forth to provide a more thorough understanding of the various embodiments. However, it will be apparent to one of skilled in the art that the inventive concepts may be practiced without one or more of these specific details.

As mentioned above, a streaming service pre-caches a media item by storing media streams associated with the media item in the cache of an edge server in the content distribution network. The media streams may be stored in the cache before a client requests the media item. For example, before releasing a new television episode, a streaming service may store the media streaming files ("media streams") associated with the television episode in a cache included in an edge server in the content distribution network. Caching the media streams associated with the new television episode at the edge server reduces the time between when a client initially requests the new television episode and the time at which the client device receives a media stream associated with the new television episode for playback.

Edge server cache storage capacity is limited, so if the cache is not populated intelligently, the cache of the edge server may be filled with rarely-accessed data, while more frequently-accessed data remains in the various data stores within the content distribution network with a relatively longer streaming latency. For example, the video streaming service could maintain 30 distinct media streams associated with the same media item. The 30 distinct versions of the audiovisual program could include, for example, versions of the media item encoded at different video resolutions (e.g., 2160p high-dynamic range (HDR), 1080p, 480i, etc.) and different audio encodings (e.g., mono, 5.1 stereo, 7.1 stereo, etc.). These streams could provide different experiences for different devices, network connections, etc. As a result, when a conventional streaming service pre-caches a media item, such as a theatrical film, the video streaming service fills the cache of the edge server with data for each of the distinct media streams associated with the media item, irrespective of whether client devices that connect to the edge server are likely to request particular playback streams. Consequently, the cache of the edge server is filled with media streams that are rarely accessed by client devices, wasting the memory resources of the cache. For example, the streaming service may store a media stream encoded at a very low video resolution that is rarely accessed by client devices. The rarely-accessed media stream thus occupies space in the cache that could be occupied with other media streams that client devices frequently request.

To address these issues, various embodiments include a content distribution system that includes a content database and one or more caches included in one or more edge servers. The content database stores media streams associated with a library of media items. For a given media item, the content database may store multiple media streams. For example, the content database could store one or more media streams associated with a 28-minute television episode, where each of the one or more media streams includes data associated with the television episode that is encoded at different streaming bitrates. Each media item includes a contiguous sequence of data files ("chunks"), where each chunk includes data that is needed by a playback application to render a corresponding interval of the media item. Continuing the example above, a given media item associated with the 28-minute television episode includes a sequence of 560 chunks, where each chunk includes the data needed to render a corresponding 3-second interval of the television episode. In various embodiments, the cache included in an edge server may store one or more of the 560 chunks of the media item associated with the 28-minute television episode.

In various embodiments, the content distribution system may include a pre-caching application that identifies one or more media items to cache in an edge server. When cached, a playback application may receive one or more portions of the media item from the cache instead of the content database, speeding the playback at the playback device. In order to efficiently use the cache to enhance the efficiency of playback for multiple playback devices, the content distribution system may determine which media items should be stored in the cache before being requested by a client device, and which items should remain in the content database. By filling the cache with media items that are likely to be frequently requested by the client devices that connect to the edge server that includes the cache, the content distribution system may efficiently use the limited memory resources of the cache. In some embodiments, the content distribution system may also store multiple versions of a selected media item, where each item is associated with a different video resolution or are encoded at different streaming bitrates.

In some embodiments, the content distribution system the pre-caching application may identify one or more sections of a given media item for pre-caching in lieu of pre-caching the entire media item. For example, the pre-caching application could identify the initial two minutes of the media item for pre-caching. As another example, the pre-caching application could analyze traffic data from the previous week and determine that client devices requested one or more specific sections of a media item relatively more frequently than other sections of the same media item, which correspond to specific scenes (e.g., a popular musical scene, action sequence, highlight performance, etc.). The pre-caching application could then identify these specific sections of the media item, instead of the entire media item, for pre-caching at the edge server.

Once a particular section of a media item is identified, the pre-caching application determines the media streams associated with the media item to cache, and determines the included chunks of data that are to be stored in the cache. In various embodiments, each media stream associated with the media item may include digital content encoded at a different bitrate. For an identified section of the media item, the pre-caching application may determine that chunks corresponding to that section need to be pre-cached from only a subset of the media streams associated with the media item. For example, chunks from only the media streams encoded at the highest bitrate and the second highest bitrate could be pre-cached, based on the historical access patterns and other attributes associated with the media item.

At least one technological advantage of the disclosed techniques relative to the prior art is that the limited storage capacity of a cache included in an edge server is filled with chunks corresponding to sections of media items that are most likely to be accessed by clients of the network infrastructure, thus beginning playback of the media item in an efficient manner. Once the chunks from the cache, associated with the relevant section of the selected media item, have been delivered to the client device, the content distribution server may begin delivering subsequent chunks in the sequence from the data store of the content server. Although the data store may be slower for the client device to access the subsequent chunks, the prior delivery of chunks from the cache allows the client device to begin playback of the media item while the subsequent chunks are being accessed and delivered from the data store. In addition, storing multiple chunks corresponding to a particular section of a media item in the cache enables the content distribution network to provide adaptive playback efficiently, enhancing playback capabilities for a variety of playback scenarios, and thereby enhancing performance for multiple clients viewing a particular media item above what clients would otherwise experience when sections of requested media items are not pre-cached.

System Overview

FIG. 1 illustrates content distribution system 100 configured to implement one or more aspects of the present disclosure. As shown, content distribution system 100 includes, without limitation, content distribution server 110, client device 120, and control server 140. Content distribution server 110 includes content database 112 and cache 114. Client device includes content buffer 124 and playback application 126. Control server 140 includes pre-caching application 142 and attribute database 144.

For explanatory purposes, multiple instances of like objects are denoted with reference numbers identifying the object and additional numbers identifying the instance where needed. Further, content distribution system 100 includes multiple instances of devices, even when not shown. For example, content distribution system 100 could include multiple content distribution servers 110 (e.g., 110-1, 110-2, etc.), client devices 120 (e.g., 120-1, 120-2, etc.), or control servers 140 (e.g., 140-1, 140-2, etc.), and still be within the scope of the disclosed embodiments.

In various embodiments, each of servers 110 and 140 may include one or more devices that include a processor and memory. In various embodiments, a single server may operate as both content distribution server 110 and control server 140. For example, a single server (not shown) could act as content distribution server 110 and control server 140.

Content distribution server 110 stores media streams, which are associated with a library of media items. In addition, content distribution server 110 receives and responds to requests from client devices 120 for such media streams. In various embodiments, content distribution server 110 may be an edge server that includes content database (DB) 112 and cache 114. Content database 112 stores media streams associated with various media items. In various embodiments, a media stream may include video data, audio data, textual data, graphical data, metadata, or other types of data. For a given media item, content database 112 may store multiple media streams associated with the media item (referred to herein as the "set of media streams associated with the media item"). In various embodiments, each media stream in the set of media streams associated with a given media item may include the same digital content that is encoded at different playback qualities. For example, a set of media streams associated with a given 28-minute episode of a television series could include one media stream including content encoded at a first bitrate, and another media stream including content encoded at a second bitrate. The digital content included in each media stream is represented as a contiguous sequence of chunks, where each chunk includes data that is needed for a media player to render a corresponding interval of the media item. Continuing the example above, a given media stream associated with the 28-minute television episode could include a sequence of 168 chunks, where each chunk includes data needed to render a corresponding 10-second interval of the television episode.

Cache 114 is a portion of volatile memory that temporarily stores chunks of media streams associated with one or more media items. Each chunk of a media stream stored in the cache is associated with a cache header that specifies various attributes of the stored chunk. For example, a cache header for a given chunk could include a Max-Age value that specifies how long the chunk is valid while stored in cache 114. The cache header could also include a unique asset identifier (UAID) that is associated with a particular media item that corresponds to the media stream.

In prior systems that pre-cache media items, an origin server typically assigns a standard Max-Age value (e.g., 7 days) to all media items sent to the cache. Once a media item has been stored in the cache for the time defined by the Max-Age value, the media item will be marked as "stale." Being marked as stale causes the caching system to respond to a request for the media item by communicating with the source of the media item to verify the status of the media item (e.g., whether the cached version remains the current version). In addition, once a media item is marked as stale, the media item becomes eligible for deletion if space is needed within the caching system.

While prior systems set a standard Max-Age value that is applied to all pre-cached media items, in various embodiments, pre-caching application 142 may use knowledge of content and the media items, along with a known refresh rate, to apply a system-specific Max-Age that informs cache 114 to store a particular media item beyond an initial Max-Age value that was specified by the content source. As a result, the content source may specify a Max-Age value of 7 days for a given media object, while pre-caching application 142 may apply a specific Max-Age value of 30 days to the given media object. Rather than selecting a standard Max-Age value to apply to all pre-cached media items, as in prior systems, media items stored in cache 114 may be assigned a Max-Age value that is determined from analysis of content and associated metadata. In this manner, a given media item receives a custom Max-Age value that increases the efficiency of content distribution system 100. For example, pre-caching application 142 may calculate the custom Max-Age value for a given pre-cached media item by multiplying the currently-assigned Max-Age value by a constant value (e.g., multiplying the assigned Max-Age value of 7 days by three to produce a value of 21 days). In another example, pre-caching application 142 could assign the media object a custom Max-Age value that extends the Max-Age value to a fixed value (e.g., assigning the media item a Max-Age value of 1 year).

Control server 140 operates in conjunction with content distribution server 110 to monitor and selectively fill cache 114 with chunks of media streams from content database 112. In various embodiments, control server 140 may generate a group of candidate media streams to fill cache 114, where each candidate media stream meets a threshold likelihood of being requested by client devices 120. In such instances, control server 140 may implement pre-caching application 142 to select particular chunks from the candidate media streams in order to efficiently fill cache 114. In other embodiments, the group of candidate media streams may, additionally or alternatively, be a list of available streams that are ranked according to a likelihood that a candidate media stream will be requested by client device(s) 120, without application of a threshold.

Control server 140 includes pre-caching application 142 and attribute database 144. Attribute database 144 stores various attributes associated with the library of media items for which media streams are stored in content database 112. In various embodiments, for a given media item, the attributes may include historical access patterns that are determined based on previously-received requests for the media item or related media items. Such patterns may include, but are not limited to, a frequency with which a media item was requested, a frequency with which a section of a media item was requested, a frequency with which media items belonging to a single genre or a single series associated with a media item were requested, or a frequency with which individual media streams corresponding to a media item were requested. For a given media item, the attributes may also include content attributes, such as genres, cast members, important sections of the media item, etc.

Pre-caching application 142 identifies particular media items and sections of media items for selectively pre-caching in cache 114, prior to client devices 120 requesting those media items or particular sections of the media items. Once a particular section of a media item is identified, pre-caching application 142 determines media streams that correspond to the media item, where the media streams include chunks to be stored in cache 114. As discussed above, in various embodiments, different media streams associated with the media item may include digital content encoded at different bitrates. For a section of the media item identified for pre-caching, pre-caching application 142 may determine that chunks corresponding to the section only need to be pre-cached from a subset of the media streams associated with the media item. For example, pre-caching application 142 could determine, based on attribute patterns associated with the media item, that only chunks included in a media stream that is encoded at the highest bitrate should be pre-cached.

The operations of pre-caching application 142 with respect to identifying media items for pre-caching, sections of the identified media items for pre-caching, and media streams from which chunks corresponding to the identified sections are pre-cached, are described in greater below in conjunction with FIGS. 2-5.

Client device 120 communicates with content distribution server 110 to download content, such as media streams associated with various media items. In various embodiments, client device 120 may be a device capable of enabling streaming playback of a media stream via playback application 126. In various embodiments, one or more client devices 120 may include computer systems, set-top boxes (STBs), mobile computers, smartphones, tablets, console video game systems, handheld video game systems, digital video recorders (DVRs), DVD players, connected digital TVs, dedicated media streaming devices ("stream boxes"), or any other technically-feasible computing platform that has network connectivity via network 150 and is capable of presenting content (e.g., text, images, audio, video, etc.) to a user.

Playback application 126 performs various playback functions associated with digital content items, including one or more media streams that correspond to specific media items. In various embodiments, playback application 126 performs one or more functions, such as displaying a graphical user interface (GUI) for media item selection, or causing video playback of media streams associated with selected media items. The GUI provides a mechanism for user interaction with client device 120. Persons skilled in the art will recognize various operating systems or user interfaces that are suitable for incorporation into playback application 126. In various embodiments, control server 140 may execute playback application 126 in order to request or receive content from content distribution server 110 via network 150. For example, in response to a user request for a particular media item, playback application 126 could cause client device 120 to send a request to content distribution server 110 for a particular media item. Further, in some embodiments, control server 140 may execute playback application 126 in order to interpret data, then present content via a display device, or one or more user input/output (I/O) devices.

Content buffer 124 is a portion of memory, included in a memory subsystem of client device 120, which temporarily stores chunks of media streams. In operation, playback application 126 causes chunks of a media stream to be downloaded into a first-in, first-out (FIFO) queue in content buffer 124. In various embodiments, playback application 126 may load a sequence of one or more chunks of a media stream into content buffer 124, where video decoders, audio decoders, or other content processors associated with playback application 126 read units of data from content buffer 124 and render the data into a sequence of video frames of the media item.

Selective Pre-Caching of Media Items

Figure 2:
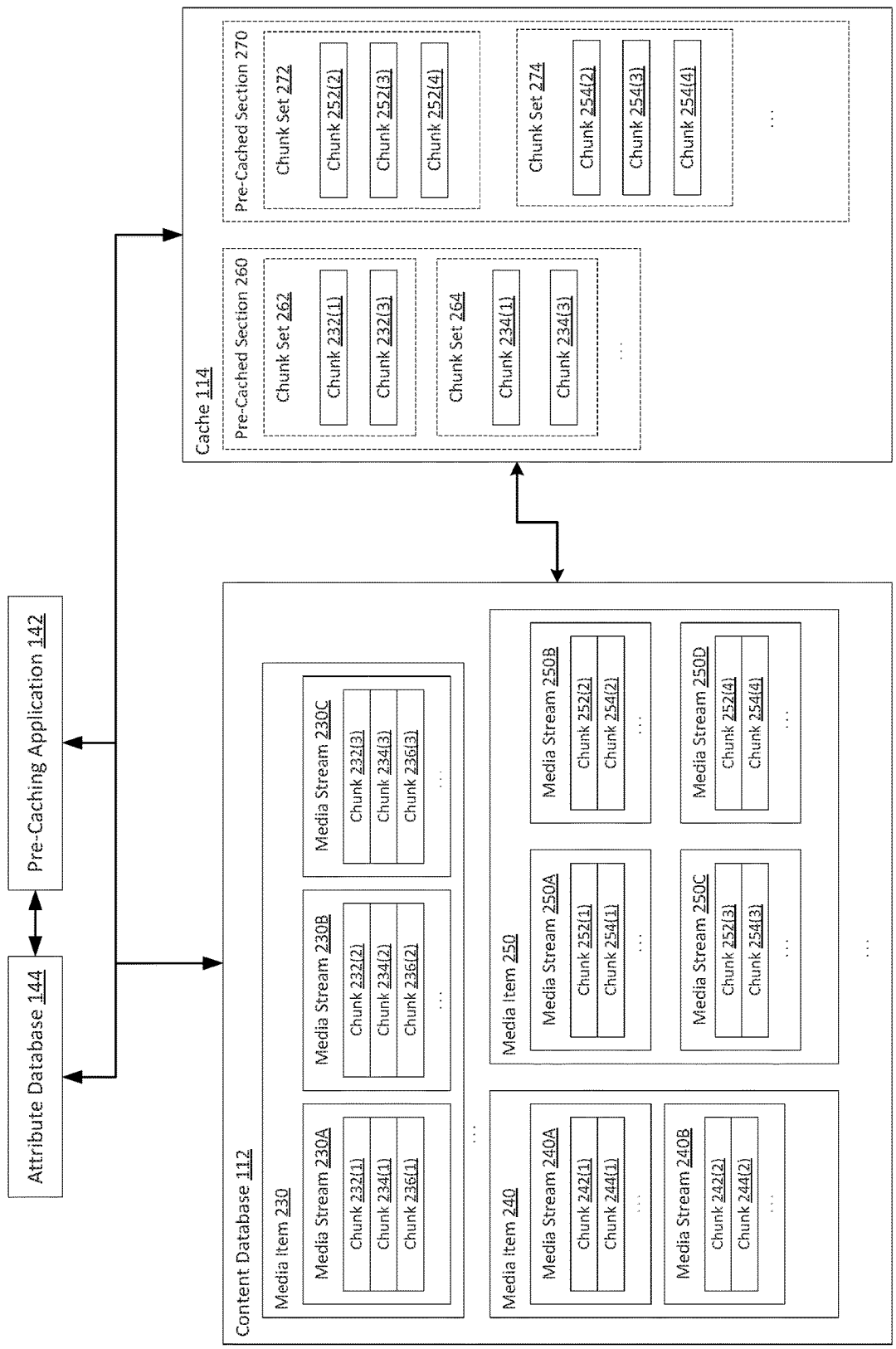
FIG. 2 is a more detailed illustration of the content distribution system of FIG. 1, according to various embodiments.

FIG. 2 is a more detailed illustration of content database 112 and cache 114 of FIG. 1, according to various embodiments. As discussed above, content database 112 stores digital content associated with any number of media items, such as media item 230, 240, and 250, in non-volatile memory.

In some embodiments, each media item is associated with a unique asset identifier (UAID). Further, each media item 230, 240, 250 is associated with one or more media streams (e.g., media streams 230A-230C associated with media item 230) that enable streaming playback of the media item at corresponding streaming bitrates. For example, media stream 230A may be a version of media item 230 encoded at a high bitrate, while media stream 230B is encoded at a medium bitrate, and media stream 230C is encoded at a low bitrate. Each media stream 230A-230C, 240A-240B, 250A-250D is stored as a sequence of chunks. A given section of the media item, which spans a specified interval of time, corresponds to a given set of chunks that is included in each of the associated media streams. For example, when each chunk corresponds to a three-second time interval of a media item, one version of the first thirty-second section of media item 230 may be stored as chunks 232(1), 234(1), 236(1) of media stream 230A.

In one example, content database 112 could store different television episodes of a series as separate media items 230, 240, 250. For a given episode, such as media item 230, content database 112 could store three distinct media streams 230A, 230B, and 230C. Each of media streams 230A-230C, when transmitted to client device 120 in real-time, enables streaming playback at different streaming bitrates, as specified in Table 1.

TABLE 1

Streaming Bitrates of Media streams for Media item 230

| Media item Stream | Streaming Bitrate |
|---|---|
| Media Stream 230A | 3,000 Kbps |
| Media Stream 230B | 1,300 Kbps |
| Media Stream 230C | 500 Kbps |

Each media stream 230A-230C includes a sequence of contiguous chunks that correspond to a sequence of contiguous intervals of media item 230. For example, chunk 232(1) could include data necessary for streaming playback of the first three-second interval of media item 230 at a streaming bitrate of 3,000 Kbps. In addition, chunk 234(2) may be sequentially played subsequent to chunk 234(1). In such instances, chunk 234(2) could include data necessary for streaming playback of the second three-second interval of media item 230, subsequent to the first three-second interval of media item 230, at a streaming bitrate of 3,000 Kbps.

In various embodiments, each media stream 230A-230C may be stored as a sequence comprising thousands of contiguous chunks. For example, when media item 230 is a 90-minute episode of a television program, media stream 230A may be stored as a sequence of 1,800 contiguous chunks (e.g., 232(1), 234(1), 236(1), etc.), each chunk including data necessary for streaming playback of six-second intervals of media item 230. In some embodiments, each chunk included in a media stream may be stored with a corresponding identifier. The identifier may include the unique asset identifier (UAID) of the particular media item corresponding to the media stream that includes the chunk. For example, media item 240 could have a UAID value of "7358." In such instances, each chunk 242, 244 is stored in association with the UAID value of 7358.

In operation, pre-caching application 142 analyzes attributes of media items stored in attribute database 144 in order to identify one or more media items (and one or more sections of the media items) for pre-caching. For example, pre-caching application 142 could analyze attributes of media items, such as traffic data, log data, metadata, etc. associated with various media items. In such instances, pre-caching application 142 may determine from the analysis the popularity of media item 230 for a given time period. In various embodiments, pre-caching application 142 may, based on this determination, first identify media item 230 as a candidate media item that may be pre-cached in cache 114 in a subsequent time period.

In some embodiments, pre-caching application 142 may also analyze attributes of specific sections of the media items (e.g., analyze traffic data for requests of specific scenes, identify actors or characters included in a scene, etc.). In such instances, pre-caching application 142 could identify a specific section of media item 230 (e.g., the first five-minute section) as a candidate section for pre-caching. For example, pre-caching application 142 could analyze traffic data and, based on analyzing the URL construction of frequently-requested URLs, identify a three-minute section of media item 230 as a candidate for pre-caching. Pre-caching application 142 could then determine one or more chunks that correspond to the identified three-minute section.

In various embodiments, attribute database 144 stores access patterns associated with media streams, or portions thereof, stored in cache 114 at any given time. Such access patterns can be gathered based on identifying the most frequently-used chunks of the media streams, the least-recently-used (LRU) chunks of the media streams, the number of access failures, etc. The access patterns may be timestamped, such that historical access patterns occurring within the past hour, 24 hours, previous week, previous month, etc. may be determined.

In various embodiments, pre-caching application 142 may analyze access patterns and other attributes that are stored in attribute database 144 in order to identify a set of candidate media items for pre-caching. In various embodiments, the other attributes associated with a media item may include metadata associated with a rendition of media item, such as content components (e.g., cast, crew, characters, setting, production date, spoken language, etc.), and metadata associated with requests for a particular media stream (e.g., geographic region, device type, communications channel, etc.).

In various embodiments, pre-caching application 142 may analyze access patterns (e.g., records of asset IDs of accessed media items) and determine a caching priority value for each media item. The caching priority value could, for example be, or represent, at least one of a frequency with which a media item was accessed during a previous time period, a likelihood value that a media item will be accessed in a given future time period, or another value that represents a relative priority value that the media item may be given for being placed in a cache, relative to other media items. In addition to determining a caching priority value for a media item, pre-caching application 142 may further analyze access patterns for specific renditions/versions of media items to generate caching priority values specific to those renditions/versions.

In some embodiments, pre-caching application 142 may identify a set of candidate media items for pre-caching. In such instances, pre-caching application 142 may analyze access patterns and generate a threshold likelihood that a given media item will be requested for subsequent playback. In some embodiments, pre-caching application 142 may limit the quantity of candidate media items included in the set by selecting only media items whose access likelihood value (which may be the same as its caching priority value) exceed the threshold value. In such instances, pre-caching application 142 could fill cache using versions of one or more media items that are included in the set of candidate media items. Additionally or alternatively, pre-caching application 142 may also include an available cache capacity as a factor in the determination so that, all media items whose caching priority values exceed the threshold value will be selected for caching.

For example, pre-caching application 142 could determine the size of cache 114 and determine that cache 114 can store portions of 1% of media items stored in content database 112. In such instances, pre-caching application 142 could set a cut-off quantity that represents a number of media items (e.g., the top twenty most popular media items). Pre-caching application 142 could then select for caching the highest priority media items until the cut-off quantity is reached. In another example, the media items could be ranked according to a caching priority value, such as a probability that a given media item will be requested by a quantity of users within a subsequent time period (e.g., 10,000 requests within a week), or a percentage of the total number of media items stored in content database 112 (e.g., the top 10% of stored media items).

In various embodiments, upon setting a threshold value and a cut-off quantity, pre-caching application 142 may determine whether a particular media item is to be included in a set of candidate media items for pre-caching based on whether its caching priority value exceeds the threshold value. Pre-caching application 142 may then fill cache 114 with media items from the set of candidate media items until the cutoff-quantity is reached. For example, pre-caching application 142 could analyze attributes included in attribute database 144 in order to determine a group of media items that have been accessed frequently by one or more client devices 120 over a specific time period. In some embodiments, pre-caching application 142 could then select, from the group of candidate media items, a number of media items above the cut-off value, where the cut-off may be set based on the cache capacity, size of media items, or other factors.

In various embodiments, pre-caching application 142 may also identify media items that have content attributes that are correlated with other media items that were frequently accessed by client devices 120. For example, when the access patterns of an episode of a television series indicate that the episode is accessed with higher frequency relative to other media items, then pre-caching application 142 could determine that various media items sharing common content attributes with this episode of the television series (e.g., other episodes in the television series, media items with common cast members or characters, etc.) are similar to the media item and therefore have a similar likelihood of being requested by client devices 120 in the future. Some other content attributes may be, for example, media items that share a genre with the episode of the television series, media items sharing common production years, etc. In various embodiments, pre-caching application 142 includes, in the set of candidate media items, media items that share content attributes with the top N most-frequently-accessed media items.

In some embodiments, pre-caching application 142 may prioritize pre-caching multiple versions of a particular media item 230 over pre-caching additional media items. In such instances, pre-caching application 142 may cause cache 114 to be filled with media chunks from multiple media streams (e.g., chunks from media streams 250A, 250B, 250C, 250D of media item 250) over storing chunks from additional media items. Alternatively, pre-caching application 142 may prioritize pre-caching multiple media items. In such instances, pre-caching application 142 may select chunks from fewer media streams (e.g., chunks only from media streams 250B, 250C of media item 250) in order to reserve space for other media items (e.g., chunks from media streams 240A, 240B of media item 240).

In various embodiments, pre-caching application 142 may combine patterns related to different chunks of a media stream, such as a number of times each chunk was accessed from cache 114, in order to generate patterns related to the media stream or the media item as a whole. In particular, pre-caching application 142 may combine patterns for chunks that share a common UAID. For example, attribute database 144 could include patterns related to the most-recently-used chunks or the least-recently-used chunks in cache 114 during the previous week. Pre-caching application 142 could analyze the patterns and determine that the most-frequently-used chunk was chunk 254(3). Pre-caching application 142 could then retrieve the UAID for chunk 254(3), which is the UAID for media item 250. Pre-caching application 142 could also determine that the UAID is shared by chunks 254(1), 254(2), 254(4). In such instances, pre-caching application 142 could then analyze the patterns associated with chunks 254(1)-254(4) in order to determine access patterns with media item 250 as a whole. Pre-caching application 142 could then identify media item 250 as a candidate for pre-caching in cache 114 for the subsequent week.

Once the set of candidate media items is identified, pre-caching application 142 determines the section(s) within each of the set of candidate media items to pre-cache. In some embodiments, pre-caching application 142 may determine that the first N minutes of each of the candidate media items should be pre-cached. In some embodiments, pre-caching application 142 may determine that, for a given media item, one or more non-contiguous sections should be pre-cached. For example, if media item 240 is a musical film, then pre-caching application 142 could select for pre-caching one or more sections of media item 240 that include popular musical scenes (e.g., the 00:24-04:25, 12:30-15:42, and 57:10-1:01:35 sequences of a 1:45:20-length film).

For each section of a given media item identified for pre-caching, pre-caching application 142 identifies corresponding chunks from various media streams that are to be stored in cache 114. For ease of discussion, the following discussion assumes that the first thirty seconds of media item 230 is a section of media item 230 that pre-caching application 142 has identified for pre-caching. Pre-caching application 142 selects one or more of media streams 230A, 230B, and 230C, for pre-caching. From these media streams, pre-caching application 142 determines chunks, corresponding to the first thirty seconds of media item 230, to store in cache 114.

In particular, in some embodiments, to select one or more of media streams 230A, 230B, and 230C, pre-caching application 142 may analyze possible playback scenarios associated with transmitting chunks of media streams to client devices 120. A playback scenario specifies operating parameters relating to a hypothetical transmission of a media stream to a client device 120. Such operating parameters include, but are not limited to, geographical region (e.g., country, defined regional area, city, neighborhood, etc.), maximum video resolution (e.g., SD, HD, UHD, etc.), device type of client device 120 (e.g., desktop, mobile device, set-top box, etc.), communications bandwidth, user-preferred buffering time, communications provider for client device 120, and so forth.

In some embodiments, a playback scenario may be created by a user, such as a system administrator, of control server 140. In alternative embodiments, pre-caching application 142 may analyze historical data, such as logs of previous playback sessions, to identify operating parameters that are frequently encountered by content distribution system 100. For example, pre-caching application 142 could analyze historical data in order to generate operating parameters associated with conditions that are frequently encountered by mobile devices in the South Asia region attempting to stream media item 240 with a 1,000 Kbps communications bandwidth. In such instances, pre-caching application 142 could generate a playback scenario that includes the South Asia region and 1,000 Kbps communications bandwidth as operating parameters.

For a given playback scenario, pre-caching application 142 analyzes the operating parameters specified by the playback scenario for the media item identified for pre-caching. Pre-caching application 142 analyzes the given playback scenario in order to identify a specific media stream corresponding to the media item identified for pre-caching that, for the playback scenario, provides the best viewing experience. For example, pre-caching application 142 could determine the highest-possible streaming bitrate supported by the operating parameters specified by a given playback scenario. Upon determining the highest possible streaming bitrate that could be delivered under such operating conditions, pre-caching application 142 could then identify a media stream that can be transmitted at or below the determined highest streaming bitrate and select the identified media stream for pre-caching.

As another example, pre-caching application 142 could analyze a playback scenario that includes operating parameters associated with a virtual streaming scenario. In various embodiments, the playback scenario can be generated from aggregated data in order to create a virtual streaming scenario, where the operating parameters of the playback scenario are associated with a plurality of previous streaming sessions conducted by a plurality of users. For example, pre-caching application 142 may analyze a virtual streaming scenario that includes a UHD-capable streaming device requesting the version of media item 230 with the highest video resolution, where the communications bandwidth of the UHD-capable streaming device receiving data is 2,000 Kbps. The operating parameters could also include values, such as a preference to minimize buffering time before playback. Pre-caching application 142 could analyze the combination of operating parameters and determine that the maximum streaming bitrate under such conditions is 1,800 Kbps. Based on the determined maximum streaming bitrate, pre-caching application 142 could then determine that media stream 230B, encoded at a 1,300 Kbps streaming bitrate, would provide the best quality video for such a playback scenario. In some embodiments, pre-caching application 142 may also identify media stream 230C, encoded at 500 Kbps and having a lower visual fidelity, as video that enables faster initiation of playback for the playback scenario. In this instance, the UHD-capable streaming device may initially retrieve chunks of media stream 230C to start playback before transitioning to receiving chunks of media stream 230C for subsequent portions of the media item.

In various embodiments, pre-caching application 142 may analyze multiple playback scenarios in order to identify which one of media stream(s) 230A, 230B, and 230C, best services one or more playback scenarios. For the purposes of discussion only, the following description assumes that pre-caching application 142 identifies media stream 230C for pre-caching the first thirty seconds of corresponding media item 230. As discussed above, each section of the media item corresponds to one or more chunks included in a given media stream associated with the media item. In this example, the first thirty seconds of media item 230 corresponds to chunks 232, 234, and 236. Consequently, pre-caching application 142 stores in cache 114 copies of chunks 232(3), 234(3), and 236(3), which correspond to the first thirty seconds of media item 230.

In various embodiments, after using a playback scenario to select a first media stream corresponding to a media item identified for pre-caching, pre-caching application 142 may select for pre-caching additional media streams that also correspond to the media item identified for pre-caching. Continuing the example above, pre-caching application 142 could initially identify for pre-caching chunks 232(3), 234(3), and 236(3), which are included in media stream 230C and correspond to the first thirty seconds of media item 230. Pre-caching application 142 could then identify for pre-caching additional chunks that are included in one or more of media streams 230A and 230B and correspond to the same section of the media item identified for pre-caching. More specifically, in addition to chunk 232(3), pre-caching application 142 could select one or more of corresponding chunks 232(1) and 232(2) for pre-caching. Similarly, in addition to chunk 234(3), pre-caching application 142 could select one or more of corresponding chunks 234(1) and 234(2) for pre-caching.

In some embodiments, chunks that are stored in cache 114 that correspond to chunks from different media streams of the media item, or rendition of a media item, may be logically linked as a chunk set. In such instances, playback application 126 may receive at least one chunk included in the chunk set during playback.

For example, pre-caching application 142 could select media stream 230A and media stream 230C for pre-caching of the first thirty seconds of media item 230. Cache 114 could store pre-cached section 260 for chunks that combine to correspond to the first thirty seconds of media item 230. In some embodiments, pre-cached section 260 may include separate chunk sets 262, 264 that correspond to distinct sections. For example, chunk 232(1) and chunk 232(3) could be stored in cache 114 and logically linked as chunk set 262, and chunk 234(1) and chunk 234(3) could be stored in cache 114 and logically linked as chunk set 264. As another example, pre-caching application 142 selects media stream 250B, media stream 250C, and media stream 250D for pre-caching of the first thirty second section of media item 250. In such an example, chunk 252(2), chunk 252(3), and chunk 254(4) are stored in cache 114 and logically linked as chunk set 272, and chunk 254(2), chunk 254(3), and chunk 254(4) are stored in cache 114 and logically linked as chunk set 274. Chunks sets 272 and 274, among others, make up pre-cached section 270 that corresponds to the first thirty-second section of media item 250 that was identified for pre-caching.

In some embodiments, control server 140 may include a bitrate ladder. The bitrate ladder may be a table that lists, for each media stream corresponding to each media item, the video resolution for the media stream, and the streaming bitrate of the media stream when rendered by playback application 126. In such instances, after using a playback scenario to select a first chunk for pre-caching, pre-caching application 142 refers to the bitrate ladder in order to select one or more additional chunks for pre-caching. For example, a bitrate ladder listing media streams 230A-230C for media item 230 could list the respective video resolutions for media streams 230A-230C, as well as the respective streaming bitrates at which media streams 230A-230C are rendered. Table 2 shows an example bitrate ladder for media streams 230A-230C.

TABLE 2

Bitrate Ladder of Media streams for Media item 230

| Media item Stream | Video Resolution | Streaming Bitrate |
| --- | --- | --- |
| Media Stream 230A | 1080p | 3,000 Kbps |
| Media Stream 230B | 720p | 1,300 Kbps |
| Media Stream 230C | 360p | 500 Kbps |

The bitrate ladder of Table 2 specifies that media stream 230C, which includes chunks 232(1), 234(1), etc., has a 1080p video resolution and is encoded at a streaming bitrate of 3,000 Kbps. In such instances, pre-caching application 142 could refer to the bitrate ladder of Table 2 in order to identify one or more additional chunks, if any, from media streams 230A and 230B, for storing in the cache 114. In some examples, pre-caching application 142 could determine that additional chunk 232(3) and 234(3) are to be pre-cached, where the selection of chunks 232(1), 232(3), 234(1), 234(3) pre-caches an appropriate mix of high-quality and medium-quality bitrates.

In some embodiments, once a chunk set is stored in cache 114, pre-caching application 142 may set or modify properties of each chunk stored in the chunk set in order to prevent those chunks from deletion in the cache prematurely. In such instances, pre-caching application 142 may dynamically analyze both content database 112 and cache 114 in order to manage the contents of cache 114, ensuring that cache 114 is filled with data that is likely to be requested by client devices 120.

For example, pre-caching application 142 could dynamically set or adjust the Max-Age value that is included in a cache header associated with a chunk stored in cache 114. In some instances, pre-caching application 142 could initially modify the Max-Age value associated with a given chunk from a default value of 600 seconds (10 minutes) to a modified value of 604,800 seconds (1 week) in order to prevent the chunk from being subject to short-term expiration or deletion. Pre-caching application 142 could subsequently modify a Max-Age value for the chunk from the modified value of 604,800 seconds to a new value of 60 seconds in order to make the chunk subject to least-resource-used analysis and be overwritten. For example, pre-caching application 142 could periodically (e.g., in hourly, daily, or weekly intervals) analyze the chunks stored in cache 114 and adjust Max-Age values of less-popular chunks in order to make the chunks subject to expiration.

Figure 3:
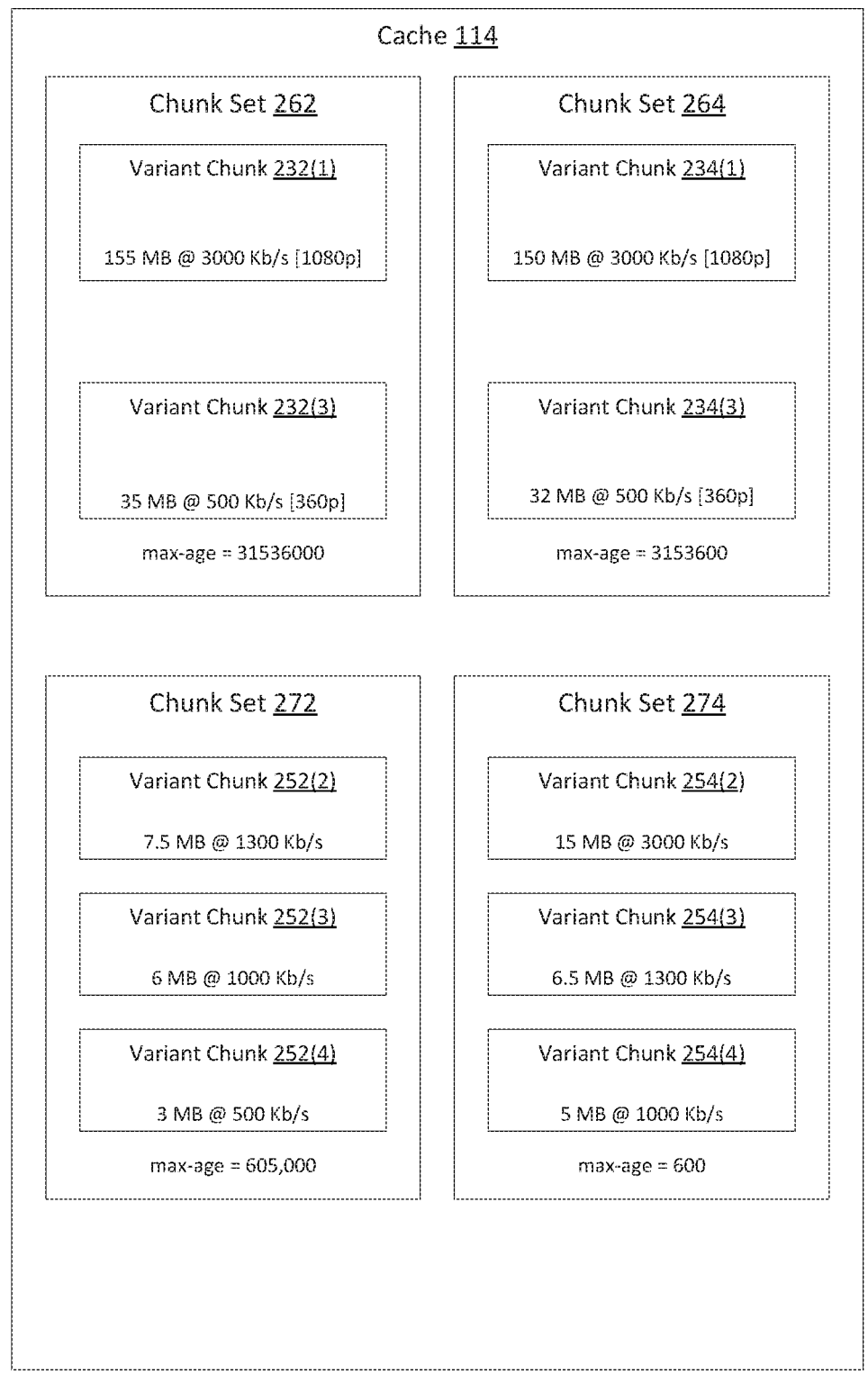
FIG. 3 is a more detailed illustration of the cache of FIG. 2, according to various embodiments.

FIG. 3 is a more detailed illustration of cache 114 of FIG. 2, according to various embodiments. As shown, cache 114 includes chunk sets 262, 264, 272, and 274. Further, each chunk in a given chunk set is associated with a different streaming bitrate. For example, chunk set 262 includes chunks 232(1) and 232(2). As discussed above, each of chunk 232(1) and chunk 232(2) corresponds to the same three-second interval of media item 230 and are copied into cache 114 from media stream 230A and media stream 230B, respectively.

Playback application 126 transmits requests for content related to media items of content distribution system 100, and, in response, content distribution system 100 transmits to playback application 126 chunks of media streams corresponding to media items. For example, in response to receiving a request for the first thirty seconds of media item 230, content distribution system 100 could determine a version of media item 230 that playback application 126 is to receive, and whether chunks from the selected media stream corresponding to the determined version are in cache 114. When chunks from the selected media stream (e.g., chunks 232(1), 232(2) of media stream 230A) are stored in cache 114, playback application 126 receives the chunks from cache 114 instead of content database 112. Otherwise, when chunks from the selected media stream are not stored in cache 114 (e.g., subsequent chunks of media stream 230A or media stream 240B), playback application 126 may receive chunks from content database 112.

In various embodiments, playback application 126 may receive chunks corresponding to contiguous intervals that are encoded at different bitrates. For example, playback application 126 could initially receive chunk 232(3) from chunk set 262 for rendering the first 10 seconds of media item 230. Chunk 232(3) is encoded at a 500 Kb/s bitrate. Thus, because of the small file size of chunk 232(3) relative to the other chunk(s) included in chunk set 262, playback application 126 could receive the entire chunk 232(3) quickly, thus enabling playback application 126 to enact a quicker startup of the playback of media item 230. Playback application 126 could then receive a subsequent chunk in the sequence. In order to transition to a higher-quality media stream, playback application 126 receive chunk 234(1) instead of chunk 234(3), as chunk 234(1) is encoded at a 3000 Kb/s bitrate. Playback application 126 could receive subsequent chunks (e.g., chunk 236, etc.) corresponding to intervals of media item 230 that are encoded at the same streaming bitrate, a higher streaming bitrate, or a lower streaming bitrate. For example, when streaming a given media item, client device 120 could receive a first sequence of three chunks encoded at a 3,000 Kbps streaming bitrate, receive a second sequence of three chunks encoded at a 5,000 Kbps streaming bitrate, and receive the remaining sequence of chunks encoded at a 16,000 Kbps streaming bitrate.

In various embodiments, at any given time, pre-caching application 142 may analyze cache 114 in order to determine the remaining storage capacity available in cache 114. In such instances, pre-caching application 142 may determine whether to store additional chunk sets in cache 114 in order to occupy the available space, or whether to cause at least some of the chunk sets stored in cache 114 to be removed from cache 114.

As shown, each chunk set 262, 264, 272, and 274 has a Max-Age value. In various embodiments, pre-caching application 142 may dynamically control the contents of cache 114 by modifying Max-Age values that are in the cache headers corresponding to specific chunks. For example, chunks included in chunk set 274 have a Max-Age of 600 seconds, indicating that chunks in chunk set 274 are subject to be removed from cache 114 relatively quickly. Conversely, chunks included in chunk sets 262 and 264 have Max-Age values of 31,536,000 seconds (1 year), indicating that chunks in chunk sets 262 and 264 have semi-permanent times-to-live (TTLs) in cache 114. Chunks included in chunk sets 262 and 264 could remain in cache 114 until pre-caching application 142 modifies the Max-Age values to values that would make the chunks be subject to removal from cache 114.

Figure 4A:
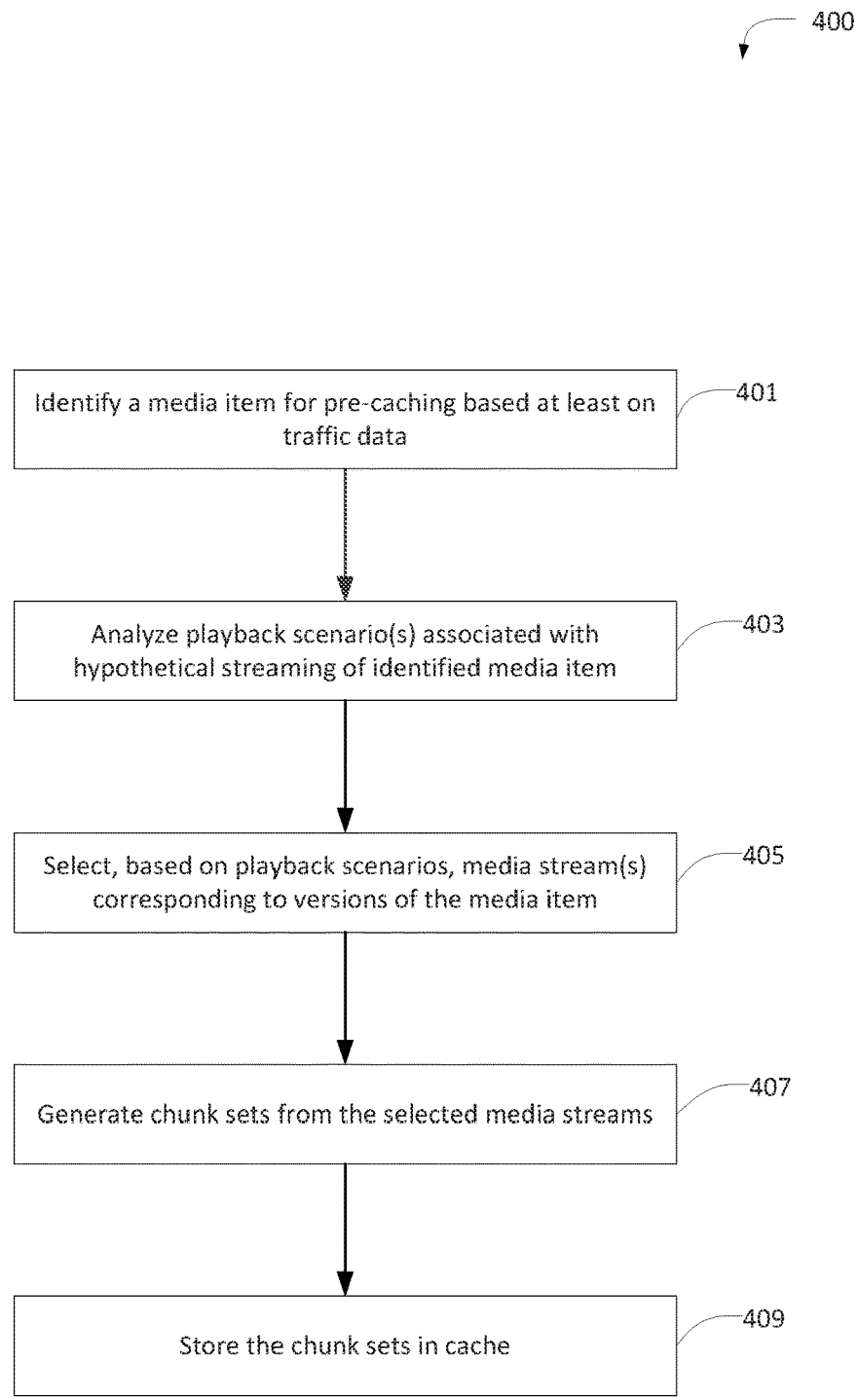
FIG. 4A is a flow diagram of method steps for selectively pre-caching multiple versions of an audiovisual program, according to various embodiments.

FIG. 4A is a flow diagram of method steps for selectively pre-caching multiple versions of an audiovisual program, according to various embodiments. Although the method steps are described in conjunction with the systems of FIGS. 1-3 and 5, persons skilled in the art will understand that any system configured to perform the method steps in any order falls within the scope of the present embodiments.

As shown, method 400 begins at step 401, where pre-caching application 142 identifies a media item for pre-caching. In various embodiments, pre-caching application 142 may analyze attributes stored in attribute database 144 in order to identify a group of media items as candidates for pre-caching. The attributes stored in attribute database 144 are associated with the library of media items for which media streams are stored in content database 112. Pre-caching application 142 may analyze the attributes in order to generate the group of candidate media items and identify, from the group of candidate media items, a particular media item for pre-caching.

For example, pre-caching application 142 could analyze attributes generated from operations (e.g., cache inspection operations, historical log data operations including requested URLs associated with a particular version of a media item) associated with previously-received requests for media items. Pre-caching application 142 could analyze such attributes in order to determine which media items meet a threshold likelihood of being requested for subsequent playback, and place media items that meet the threshold likelihood into the group of candidate media items. Pre-caching application 142 may then apply other statistics, such as regional preferences, edge statistics, device-specific metrics, and so forth, to select a particular media item from the group of candidate media items.

In some embodiments, pre-caching application 142 may map attributes of an existing candidate media item to a new media item in order for the new media item to be included in the group of candidate media items. In some embodiments, pre-caching application 142 may select a particular rendition of a media item for pre-caching. For example, pre-caching application 142 could analyze geographic regional preferences to select a Spanish-language rendition of a television episode for pre-caching. Similarly, pre-caching application 142 could analyze device usage that connects to a cache included in a particular edge content distribution server and, based on the devices that connect to the edge content distribution server, select a rendition of a film that is optimized for playback by a particular device type.

In another example, for a popular episodic series, an episode that is about to be released has no prior access history of its own. However, the popularity of other episodes in the series causes pre-caching application 142 to anticipate that a new episode is to be among the most-frequently-requested media items upon release. In such instances, pre-caching application 142 could identify a caching priority value associated with the series and could be apply the caching priority value to the new episode. The new episode therefore receives a priority value that reflects an accurate anticipated popularity of the media item.

At step 403, pre-caching application 142 analyzes playback scenario(s) associated with the hypothetical streaming of the identified media item. In various embodiments, pre-caching application 142 may analyze one or more playback scenarios generated from previous attribute data and traffic data associated with multiple playback devices requesting playback of various media items. A given playback scenario aggregates such data to generate a hypothetical playback request by a hypothetical playback device with various operating parameters associated with content distribution system 100 transmitting the identified media device to the hypothetical client device for streaming playback.

For example, pre-caching application 142 could analyze a particular playback scenario that includes a particular set of operating parameters (South Asian region, 800 Kbps communications bandwidth, etc.) relating to the hypothetical client device attempting streaming playback of the identified media item. In such instances, pre-caching application 142 may identify one or more versions of the identified media item that could successfully be streamed to the hypothetical playback device in a manner that enables an enjoyable viewing experience (e.g., minimal buffering, minimal packet loss, acceptable video resolution, synchronized audio and visual playback, etc.). In the above example, pre-caching application 142 could determine that versions of the identified media item that can be streamed at a streaming bitrate of 700 Kbps or greater would satisfy the particular playback scenario.

At step 405, pre-caching application 142 selects, based on the playback scenarios, media streams corresponding to the identified versions of the identified media item. In various embodiments, pre-caching application 142 may use determinations relating to the playback scenarios in order to select versions of the identified media item to pre-cache. Pre-caching application 142 may then select, for each selected version of the identified media item, a corresponding media stream, from which one or more chunks included in the media stream are to be pre-cached. Using the previous example, pre-caching application 142 could then use the determined streaming bitrate of 700 Kbps as a maximum bitrate to identify version(s) of a media item (e.g., SD version, mobile-optimized version, etc.) that satisfy the particular playback scenario and select media streams, corresponding to the identified version(s) of the media item, that are encoded at streaming bitrates below the determined maximum streaming bitrate.

At step 407, pre-caching application 142 generates chunk sets based on the selected media streams. In various embodiments, pre-caching application 142 may identify, in addition to a single version of the media item that satisfy a playback scenario, select additional versions of the media item. For example, pre-caching application 142 could select additional versions of the media item with different video resolutions in order to enable a transition in video quality after playback begins. In some embodiments, pre-caching application 142 may refer to a bitrate ladder in order to identify the additional versions of the media item that are applicable for pre-caching with the initially-identified version.

Once multiple versions of a media item are selected, pre-caching application 142 could select, for pre-caching, chunks in each of the selected media streams that correspond to the same section of the media item. Pre-caching application 142 may generate a chunk set that includes a logically-linked grouping of chunks that are encoded at different streaming bitrates. For example, pre-caching application 142 could, for each selected media stream 250B, 250C, 250D, select chunks 252(2), 252(3), 252(4) that correspond to a portion of the identified media item 250. Pre-caching application 142 could then generate chunk set 272 for pre-caching in cache 114.

At step 409, pre-caching application 142 stores the chunk sets in cache 114. In various embodiments, pre-caching application 142 may store one or more chunk sets as pre-cached sections in cache 114, where the pre-cached section corresponds to a section of the identified media item. For example, pre-caching application 142 may generate chunk sets 272 and 274 to be included as portions of pre-cached section 270, where pre-cached section 270 corresponds to a section of the identified media item. In various embodiments, once pre-cached section 270 is stored in cache 114, pre-caching application 142 may set or modify a Max-Age value associated with the chunks included in pre-cached section 270 in order to prevent or delay the expiration or deletion of the chunks from cache 114. For example, pre-caching application 142 could modify Max-Age values associated with chunks 252(1), 252(2), and 252(3) to be lengthened from a default value of 6000 seconds (100 minutes) to a value of 605,000 seconds (1 week).

Figure 4B:
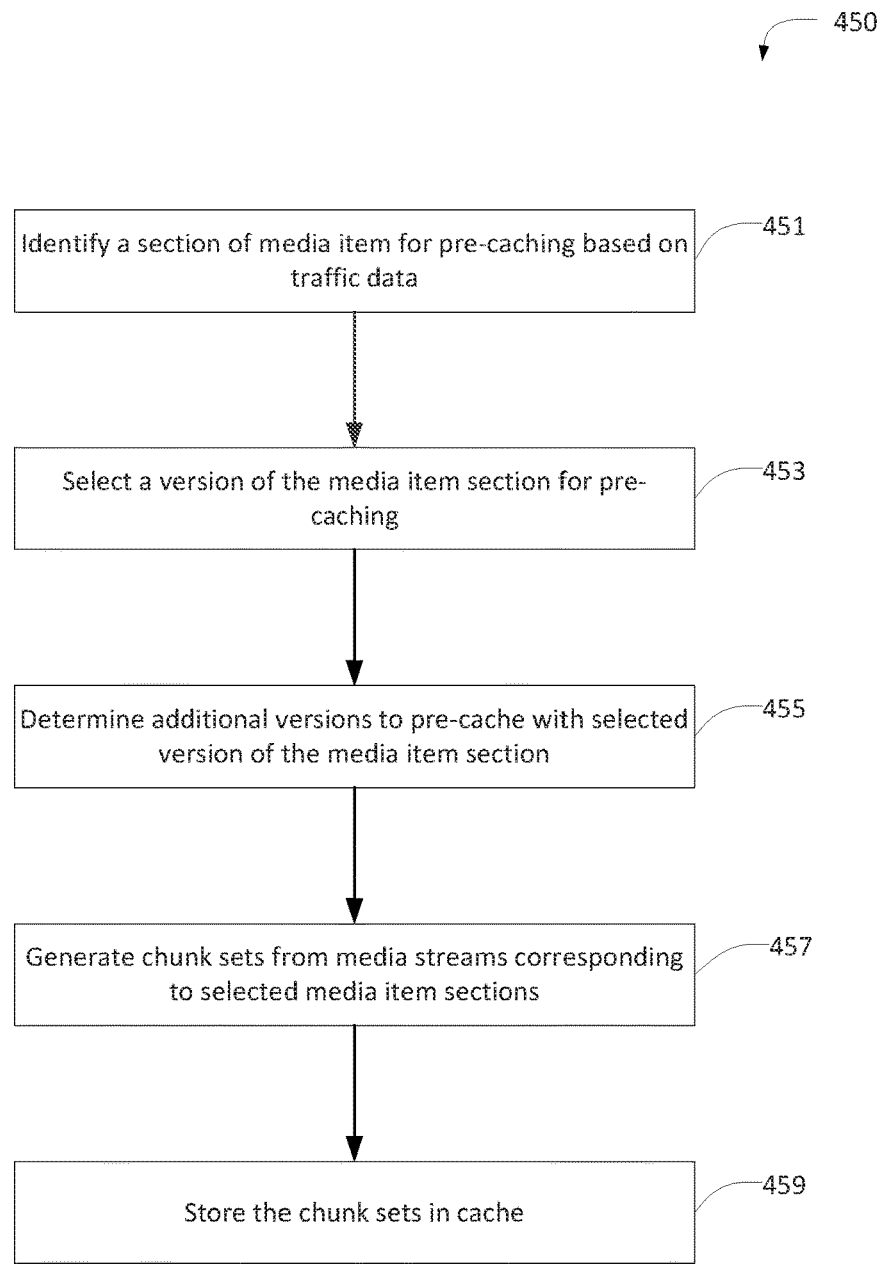
FIG. 4B is a flow diagram of method steps for selectively pre-caching multiple versions of a particular segment of an audiovisual program, according to various embodiments.

FIG. 4B is a flow diagram of method steps for selectively pre-caching multiple versions of a particular segment of an audiovisual program, according to various embodiments. Although the method steps are described in conjunction with the systems of FIGS. 1-3 and 5, persons skilled in the art will understand that any system configured to perform the method steps in any order falls within the scope of the present embodiments.

Method 450 begins at step 451, pre-caching application 142 identifies a given section of the identified media item for pre-caching. In various embodiments, pre-caching application 142 may identify particular sections of media items for selectively pre-caching in cache 114, prior to client devices 120 requesting those media items or those particular sections. In some embodiments, when analyzing the attributes included in attribute database 144, pre-caching application 142 may determine that, for a given media item, one or more contiguous or non-contiguous sections of the identified media item should be pre-cached in cache 114. For example, if a given media item is a musical film, then pre-caching application 142 could analyze traffic data in order to determine specific time periods, corresponding to musical scenes, that were requested more frequently than other portions of the film. In such instances, pre-caching application 142 could identify one or more of the musical scenes for pre-caching.

In some embodiments, pre-caching application may first identify a media item for pre-caching before analyzing data associated with particular sections of the media item. Alternatively, pre-caching application 142 may independently analyze attributes and traffic data from attribute database 144 to identify a particular section of a media item for pre-caching in lieu of determining whether the entire media item is a candidate for pre-caching. In some embodiments, pre-caching application 142 may select a particular rendition (e.g., a "sing-along" rendition of a musical scene) of the identified scene for pre-caching.

At step 453, pre-caching application 142 selects a version of the identified media item section for pre-caching. In various embodiments, pre-caching application 142 may analyze attributes and other data in attribute database 144 to select a particular version for pre-caching. In some embodiments, pre-caching application 142 may identify a particular version of the identified media item section that was more frequently-requested relative to other versions. For example, pre-caching application 142 could analyze log data from the previous month in order to determine that a UHD-version of a movie scene was more frequently-requested relative to lower-resolution versions of the same scene. In such instances, pre-caching application could identify the UHD version for pre-caching.

In some embodiments, pre-caching application 142 may analyze one or more playback scenarios associated with the streaming of the identified section to a hypothetical playback device under a specified set of operating parameters. In such instances, pre-caching application may determine an optimal streaming bitrate for viewing the identified section under such operating parameters, and pre-caching application 142 may identify a particular version of the identified section that is at or below the optimal streaming bitrate.

At step 455, pre-caching application 142 determines additional versions of the selected section of the media item to pre-cache. In various embodiments, pre-caching application 142 may identify, in addition to the version of the media item section that was previously selected for pre-caching, select additional versions of the media item section. For example, after selecting the UHD-version of the media item section, pre-caching application 142 could select additional versions of the media item with different, lower video resolutions (e.g., HD and SD video resolutions) in order to enable a playback device to seamlessly transition to higher video-resolution media streams (e.g., from SD to HD to UHD) after playback begins. In some embodiments, pre-caching application 142 may refer to a bitrate ladder in order to identify the additional versions of the media item section that are applicable for pre-caching with the initially-identified version.

At step 457, pre-caching application 142 generates chunk sets based on the selected media streams. In various embodiments, once multiple versions of a media item section are selected, pre-caching application 142 may select, for pre-caching, chunks in each of the selected media streams that correspond to the identified section of the media item. Pre-caching application 142 may generate a chunk set that includes a logically-linked grouping of chunks that are encoded at different streaming bitrates. For example, pre-caching application 142 could, for each selected media stream 250B, 250C, 250D, select chunks 252(2), 252(3), 252(4) that correspond to at least a portion of the identified section of media item 250. Pre-caching application 142 could then generate chunk set 272 for pre-caching in cache 114.

At step 459, pre-caching application 142 stores the chunk sets in cache 114. In various embodiments, pre-caching application 142 may store one or more chunk sets as pre-cached sections in cache 114, where the pre-cached section corresponds to a section of the identified media item. For example, pre-caching application 142 may generate chunk sets 272 and 274 to be included as portions of pre-cached section 270, where pre-cached section 270 corresponds to a section of the identified media item. In various embodiments, once pre-cached section 270 is stored in cache 114, pre-caching application 142 may set or modify a Max-Age value associated with the chunks included in pre-cached section 270 in order prevent expiration or deletion of the chunks from cache 114.

Overview of Network Components

Figure 5:
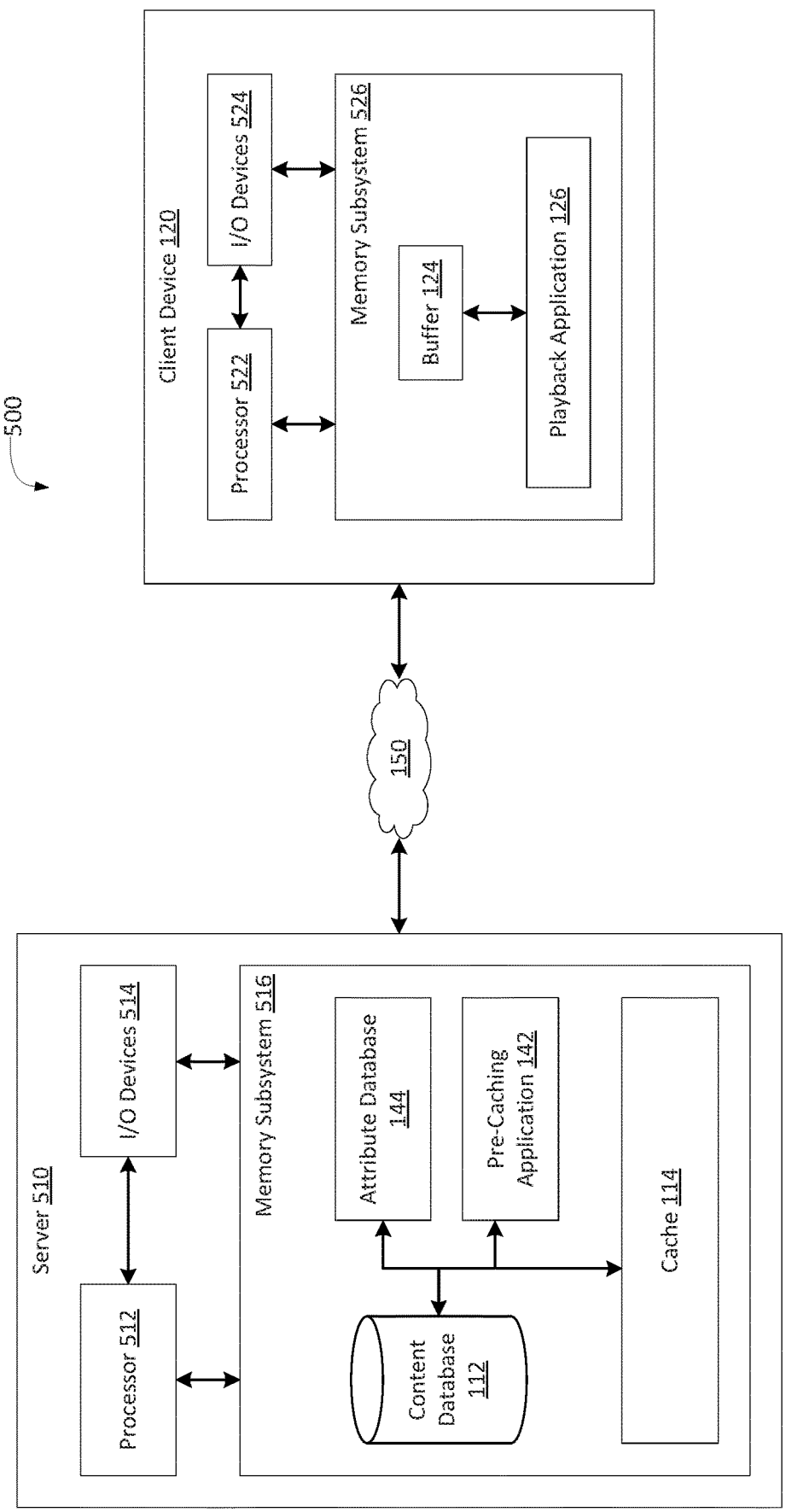
FIG. 5 illustrates components of a server and client device included in the content distribution system of FIG. 1, according to various embodiments.

FIG. 5 illustrates components of a server 510 and client device 120 included in the content distribution system 100 of FIG. 1, according to various embodiments. As shown, content distribution system 100 includes server 510 and client device 120, coupled together via a network 150. Client device 120 and server 510 may be any technically-feasible type of computer system, including a desktop computer, a laptop computer, a mobile device, a virtualized instance of a computing device, a distributed or cloud-based computer system, and so forth.

Server 510 includes processor 512, input/output (I/O) devices 514, and memory subsystem 516, coupled together. Processor 512 includes any technically-feasible set of hardware units configured to process data and execute software applications. For example, processor 512 could include one or more central processing units (CPUs). I/O devices 514 include any technically-feasible set of devices configured to perform input and output operations, including, for example, a display device, a keyboard, or a touchscreen, among others.

Memory subsystem 516 includes any technically-feasible storage media configured to store data and software applications. Memory subsystem 516 may include volatile memory, such as, for example, cache 114 or random-access memory (RAM). Memory subsystem 516 may also include non-volatile a hard disk storing mass storage, a module, or read-only memory (ROM). In various embodiments, memory subsystem 516 includes content database 112, and pre-caching application 142. Pre-caching application 142 are software applications that, when executed by processor 512, interoperate with other components of content distribution system 500, including cache 114 and content database 112.

In various embodiments, memory subsystem 516 includes one or more of content database 112, cache 114, or pre-caching application 142. In various embodiments, server 510 may operate as one or more of content distribution server 110 or control server 140. For example, server 510 could act as both content distribution server 110 and control server 140. In such instances, server 510 could execute pre-caching application 142 in order to control the contents of cache 114. In another example, server 510 could act as content distribution server 110. In such instances, server 510 could receive command signals from control server 140 executing pre-caching application 142 in order to copy chunk sets of a given media item from content database 112 to cache 114.

Client device 120 includes processor 522, input/output (I/O) devices 524, and memory subsystem 526, coupled together. In various embodiments, memory subsystem 526 includes content buffer 124 and playback application 126. Playback application 126 is a software program that, when executed by processor 522, interoperates with other components of content distribution system 500, including content buffer 124, or server 510 to receive files associated with a particular media item and render the video in one or more frames for streaming playback via client device 120.

In sum, techniques are disclosed for selectively pre-caching sections of media items. Before receiving a request for a particular media item, chunks of media streams, which correspond to sections of the media item, are copied to into a cache that is included in an edge server of a streaming infrastructure. Various media items in the streaming infrastructure are comprised of contiguous sections that, when played in sequence, render a complete version of the media item. The streaming infrastructure stores one or more media streams that are associated with a given media item, where each different media stream includes data for streaming the media item that is encoded at a different streaming bitrate. Each media stream stores a sequence of chunks, where each chunk corresponds to a section of the media item.

A pre-caching application included in the streaming infrastructure analyzes attributes associated with one or more media items and sections of a given media item. The pre-caching application analyzes the attributes in order to identify a media item for pre-caching. The pre-caching application also analyzes the attributes in order to identify one or more streams corresponding to the media item and may identify one or more sections of the identified media item for pre-caching. For a given identified section, the pre-caching application analyzes a playback scenario that includes operating parameters associated with streaming playback of identified section. The pre-caching application analyzes the operating parameters and determines optimal parameters of media streams, such as an optimal streaming bitrate, that can adhere to the operating parameters.

The pre-caching application uses the optimal parameters of media streams in order to select one or more media streams that have parameters that adhere to the operating parameters. The pre-caching application may then select chunks from the selected media streams that correspond to the identified section of the media item. The pre-caching application groups corresponding chunks from multiple media streams together to generate chunk sets, where each chunk in the chunk set is encoded at a different streaming bitrate. The pre-caching application then copies one or more chunk sets into the cache. In various embodiments, the pre-caching application may set the maximum age of chunks stored in the cache in order to manage chunks stored in the cache such that the chunks are not prematurely subject to expiration or deletion.

At least one technological advantage of the disclosed techniques is that limited storage capacity of a cache included in an edge server is filled with chunks corresponding to sections of media items that are likely to be accessed by clients of the network infrastructure. In addition, storing particular sections of media item in lieu of the entire media item lowers the amount of space a particular media items occupies in the cache, enabling the cache to store a greater number of media items. Further, storing multiple chunks corresponding to a particular section of a media item in the cache enables the content distribution network to continue to provide adaptive playback efficiently, enhancing playback capabilities for a variety of playback scenarios, and thereby enhancing performance for multiple clients viewing a particular media item.

1. In various embodiments, a computer-implemented method for selectively caching digital content for streaming, the method comprising analyzing a set of traffic data associated with streaming of a plurality of media items in a first time period, selecting, based on the set of traffic data, a first media item for storage in a cache during a second time period, and storing in the cache, prior to receiving a request for the first media item in the second time period, at least a portion of a first media stream of a plurality of media streams associated with the first media item, and at least a portion of a second media stream of the plurality of media streams, where each media stream in the plurality of media streams is encoded with different characteristics.

2. The computer-implemented method of clause 1, where the set of traffic data comprises a log of URL requests, wherein each URL request includes an asset identifier associated with a candidate media item.

3. The computer-implemented method of clause 1 or 2, where selecting the first media item for storage comprises determining, from the set of traffic data, a caching priority value for each media item in a set of candidate media items, where the caching priority value is based on a quantity that each media item in the set of candidate media items was requested during the first time period, and selecting the first media item based on a first caching priority value for the first media item.

4. The computer-implemented method of any of clauses 1-3, where identifying the first media item for storage comprises determining, from the set of traffic data, a caching priority value for each media item in a set of candidate media items, where the caching priority value is based on a quantity that each candidate media item was requested, wherein the first media item is not included in the set of candidate media items, determining that the first media item is related to a given media item in the set of candidate media items, assigning a first caching priority value to the first media item based on the caching priority value of the given media item, and selecting the first media item based on the first caching priority value.

5. The computer-implemented method of any of clauses 1-4, further comprising analyzing, for the first media item, a second set of traffic data associated with streaming of the plurality of media streams associated with the first media item in the first time period, and selecting, based on the second set of traffic data, the first media stream and the second media stream for storage in the cache during the second time period.

6. The computer-implemented method of any of clauses 1-5, further comprising identifying, based on the second set of traffic data, a first set of media streams included in the plurality of media streams associated with the first media item, where the first set of media streams comprises a set of one or more media streams that were most frequently accessed by a specific device type during the first time period, and wherein the first media stream or the second media stream is selected from the first set of media streams.

7. The computer-implemented method of any of clauses 1-6, further comprising identifying, based on the second set of traffic data, a first set of media streams included in the plurality of media streams associated with the first media item, where the first set of media streams comprises a set of one or more media streams that were most frequently accessed in a specific geographic region during the first time period, and where the first media stream or the second media stream is selected from the first set of media streams.

8. The computer-implemented method of any of clauses 1-7, further comprising specifying a maximum age value associated with the portion of the first media stream to a first value of at least one hour, where the maximum age value specifies a length of time that the portion of the first media stream is to remain in the cache.

9. The computer-implemented method of any of clauses 1-8, further comprising analyzing a set of operating parameters associated with streaming the first media item in the second time period, determining that the first media stream satisfies the set of operating parameters, and selecting the first media stream for storage in the cache during the second time period.

10. The computer-implemented method of any of clauses 1-9, where the set of operating parameters comprises at least one of a geographical region, a playback device type, a streaming bandwidth, or a communications provider.

11. The computer-implemented method of any of clauses 1-10, further comprising generating a maximum streaming bitrate supported by the set of operating parameters, where determining that the first media stream satisfies the set of operating parameters comprises determining that the first media stream is encoded at a streaming bitrate that is lower than or equal to the maximum streaming bitrate.

12. The computer-implemented method of any of clauses 1-11, where a playback device receives at least the portion of the first media stream from the cache to initiate playback, and the playback device receives a different portion of the second media stream to continue playback.

13. The computer-implemented method of any of clauses 1-12, further comprising selecting, based on the set of traffic data, a first section of the first media item for storage in a cache during a second time period, where the first section of the first media item is determined to be more likely to be requested for playback relative to at least one other section of the first media item, and wherein storing in the cache comprises storing a first portion of the first media stream associated with the first section of the first media item.

14. In various embodiments, one or more non-transitory computer-readable storage media include instructions that, when executed by one or more processors, cause the one or more processors to perform the steps of analyzing a set of traffic data associated with streaming of a plurality of media items in a first time period, selecting, based on the set of traffic data, a first media item for storage in a cache during a second time period, and storing in the cache, prior to receiving a request for the first media item in the second time period, at least a portion of a first media stream of a plurality of media streams associated with the first media item, and at least a portion of a second media stream of the plurality of media streams, where each media stream in the plurality of media streams is encoded with different characteristics.

15. The one or more non-transitory computer-readable storage media of clause 14, further including instructions that, when executed by the one or more processors, cause the one or more processors to further perform the steps of determining, from the set of traffic data, a caching priority value for each media item in a set of candidate media items, wherein the caching priority value is based on a quantity that each media item in the set of candidate media items was requested during the first time period, and selecting the first media item based on a first caching priority value for the first media item.

16. The one or more non-transitory computer-readable storage media of clause 14 or 15, further including instructions that, when executed by the one or more processors, cause the one or more processors to further perform the steps of analyzing a set of operating parameters associated with streaming the first media item in the second time period, determining that the first media stream satisfies the set of operating parameters, and selecting the first media stream for storage in the cache during the second time period.

17. The one or more non-transitory computer-readable storage media of any of clauses 14-16, further including instructions that, when executed by the one or more processors, cause the one or more processors to further perform the step of generating a maximum streaming bitrate supported by the set of operating parameters, where determining that the first media stream satisfies the set of operating parameters comprises determining that the first media stream is encoded at a streaming bitrate that is lower than or equal to the maximum streaming bitrate.

18. In various embodiments, a computing system that selectively caches digital content for streaming comprises a memory that stores a pre-caching application; and a processor that is coupled to the memory and executes the pre-caching application to analyze a set of traffic data associated with streaming of a plurality of media items in a first time period, select, based on the set of traffic data, a first media item for storage in a cache during a second time period; and store in the cache, prior to receiving a request for the first media item in the second time period, at least a portion of a first media stream of a plurality of media streams associated with the first media item, and at least a portion of a second media stream of the plurality of media streams, where each media stream in the plurality of media streams is encoded with different characteristics.

19. The computing system clause 18, where the processor executes the pre-caching application to further determine, from the set of traffic data, a caching priority value for each media item in a set of candidate media items, wherein the caching priority value is based on a quantity that each media item in the set of candidate media items was requested during the first time period, and select the first media item based on a first caching priority value for the first media item.

20. The computing system of clause 18 or 19, where the processor executes the pre-caching application to further analyze a set of operating parameters associated with streaming the first media item in the second time period, determine that the first media stream satisfies the set of operating parameters, and select the first media stream for storage in the cache during the second time period.

Any and all combinations of any of the claim elements recited in any of the claims or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for selectively caching digital content for streaming, the method comprising:
analyzing a set of traffic data that comprises a loq of URL requests and is associated with streaming of a plurality of media items in a first time period;
selecting, based on the set of traffic data, a first media item for storage in a cache during a second time period;
identifying a first section and a second section of the first media item for storage in the cache during the second time period, wherein the first section and the second section of the first media item are identified by determining, based on an analysis of URL construction of the log of URL requests in the set of traffic data, that the first section and the second section of the first media item are each more likely to be requested for playback relative to at least one other section of the first media item, wherein the first section and the second section comprise non-contiguous sections of the first media item; and
storing in the cache, prior to receiving a request for the first media item in the second time period:
at least a portion of a first media stream of a plurality of media streams associated with the first media item, wherein at least the portion of the first media stream is associated with the first section and the second section of the first media item, and
at least a portion of a second media stream of the plurality of media streams associated with the first media item,
wherein each media stream in the plurality of media streams is encoded with different characteristics.

2. The computer-implemented method of claim 1, wherein each URL request includes an asset identifier associated with a candidate media item.

3. The computer-implemented method of claim 1, wherein selecting the first media item for storage comprises:
determining, from the set of traffic data, a caching priority value for each media item in a set of candidate media items, wherein the caching priority value is based on a quantity that each media item in the set of candidate media items was requested during the first time period; and
selecting the first media item based on a first caching priority value for the first media item.

4. The computer-implemented method of claim 1, wherein selecting the first media item for storage comprises:
determining, from the set of traffic data, a caching priority value for each media item in a set of candidate media items, wherein the caching priority value is based on a quantity that each candidate media item was requested, wherein the first media item is not included in the set of candidate media items;
determining that the first media item is related to a given media item in the set of candidate media items;
assigning a first caching priority value to the first media item based on the caching priority value of the given media item; and
selecting the first media item based on the first caching priority value.

5. The computer-implemented method of claim 1, further comprising:
analyzing, for the first media item, a second set of traffic data associated with streaming of the plurality of media streams associated with the first media item in the first time period; and
selecting, based on the second set of traffic data, the first media stream and the second media stream for storage in the cache during the second time period.

6. The computer-implemented method of claim 5, further comprising:
identifying, based on the second set of traffic data, a first set of media streams included in the plurality of media streams associated with the first media item,
wherein the first set of media streams comprises a set of one or more media streams that were most frequently accessed by a specific device type during the first time period, and
wherein the first media stream or the second media stream is selected from the first set of media streams.

7. The computer-implemented method of claim 5, further comprising:
identifying, based on the second set of traffic data, a first set of media streams included in the plurality of media streams associated with the first media item,
wherein the first set of media streams comprises a set of one or more media streams that were most frequently accessed in a specific geographic region during the first time period, and
wherein the first media stream or the second media stream is selected from the first set of media streams.

8. The computer-implemented method of claim 1, further comprising specifying a maximum age value associated with at least the portion of the first media stream to a first value of at least one hour, wherein the maximum age value specifies a length of time that at least the portion of the first media stream is to remain in the cache.

9. The computer-implemented method of claim 1, further comprising:
  analyzing a set of operating parameters associated with streaming the first media item in the second time period;
  determining that the first media stream satisfies the set of operating parameters; and
  selecting the first media stream for storage in the cache during the second time period.

10. The computer-implemented method of claim 9, wherein the set of operating parameters comprises at least one of a geographical region, a playback device type, a streaming bandwidth, or a communications provider.

11. The computer-implemented method of claim 9, further comprising:
  generating a maximum streaming bitrate supported by the set of operating parameters,
  wherein determining that the first media stream satisfies the set of operating parameters comprises determining that the first media stream is encoded at a streaming bitrate that is lower than or equal to the maximum streaming bitrate.

12. The computer-implemented method of claim 1, wherein:
  a playback device receives at least the portion of the first media stream from the cache to initiate playback; and
  the playback device receives a different portion of the second media stream to continue playback.

13. One or more non-transitory computer-readable storage media including instructions that, when executed by one or more processors, cause the one or more processors to perform the steps of:
  analyzing a set of traffic data that comprises a loq of URL requests and is associated with streaming of a plurality of media items in a first time period;
  selecting, based on the set of traffic data, a first media item for storage in a cache during a second time period;
  identifying a first section and a second section of the first media item for storage in the cache during the second time period, wherein the first section and the second section of the first media item are identified by determining, based on an analysis of URL construction of the log of URL requests in the set of traffic data, that the first section and the second section of the first media item are each more likely to be requested for playback relative to at least one other section of the first media item, wherein the first section and the second section comprise non-contiguous sections of the first media item; and
  storing in the cache, prior to receiving a request for the first media item in the second time period:
    at least a portion of a first media stream of a plurality of media streams associated with the first media item, wherein at least the portion of the first media stream is associated with the first section and the second section of the first media item, and
    at least a portion of a second media stream of the plurality of media streams,
  wherein each media stream in the plurality of media streams is encoded with different characteristics.

14. The one or more non-transitory computer-readable storage media of claim 13, further including instructions that, when executed by the one or more processors, cause the one or more processors to further perform the steps of:
  determining, from the set of traffic data, a caching priority value for each media item in a set of candidate media items, wherein the caching priority value is based on a quantity that each media item in the set of candidate media items was requested during the first time period; and
  selecting the first media item based on a first caching priority value for the first media item.

15. The one or more non-transitory computer-readable storage media of claim 13, further including instructions that, when executed by the one or more processors, cause the one or more processors to further perform the steps of:
  analyzing a set of operating parameters associated with streaming the first media item in the second time period;
  determining that the first media stream satisfies the set of operating parameters; and
  selecting the first media stream for storage in the cache during the second time period.

16. The one or more non-transitory computer-readable storage media of claim 15, further including instructions that, when executed by the one or more processors, cause the one or more processors to further perform the step of:
  generating a maximum streaming bitrate supported by the set of operating parameters,
  wherein determining that the first media stream satisfies the set of operating parameters comprises determining that the first media stream is encoded at a streaming bitrate that is lower than or equal to the maximum streaming bitrate.

17. A computing system that selectively caches digital content for streaming, the computing system comprising:
  a memory that stores a pre-caching application; and
  a processor that is coupled to the memory and executes the pre-caching application to:
    analyze a set of traffic data that comprises a log of URL requests and is associated with streaming of a plurality of media items in a first time period;
    select, based on the set of traffic data, a first media item for storage in a cache during a second time period;
    identify a first section and a second section of the first media item for storage in the cache during the second time period, wherein the first section and the second section of the first media item are identified by determining, based on an analysis of URL construction of the log of URL requests in the set of traffic data, that the first section and the second section of the first media item are each more likely to be requested for playback relative to at least one other section of the first media item, wherein the first section and the second section comprise non-contiguous sections of the first media item; and
    store in the cache, prior to receiving a request for the first media item in the second time period:
      at least a portion of a first media stream of a plurality of media streams associated with the first media item, wherein at least the portion of the first media stream is associated with the first section and the second section of the first media item, and
      at least a portion of a second media stream of the plurality of media streams,
    wherein each media stream in the plurality of media streams is encoded with different characteristics.

18. The computing system of claim 17, wherein the processor executes the pre-caching application to further:
  determine, from the set of traffic data, a caching priority value for each media item in a set of candidate media items, wherein the caching priority value is based on a quantity that each media item in the set of candidate media items was requested during the first time period; and select the first media item based on a first caching priority value for the first media item.

19. The computing system of claim 17, wherein the processor executes the pre-caching application to further:

analyze a set of operating parameters associated with streaming the first media item in the second time period;

determine that the first media stream satisfies the set of operating parameters; and select the first media stream for storage in the cache during the second time period.

\* \* \* \* \*

UNITED STATES PATENT AND TRADEMARK OFFICE
CERTIFICATE OF CORRECTION

| | | |
|---|---|---|
| PATENT NO. | : 11,451,603 B2 | Page 1 of 1 |
| APPLICATION NO. | : 16/800617 | |
| DATED | : September 20, 2022 | |
| INVENTOR(S) | : Jeffrey Grubb et al. | |

It is certified that error appears in the above-identified patent and that said Letters Patent is hereby corrected as shown below:

In the Claims

Column 25, Claim 1, Line 39, delete "loq" and insert --log--;

Column 27, Claim 13, Line 33, delete "loq" and insert --log--.

Signed and Sealed this
Thirteenth Day of December, 2022

Katherine Kelly Vidal
*Director of the United States Patent and Trademark Office*